(12) United States Patent
Clough

(10) Patent No.: US 9,014,725 B2
(45) Date of Patent: *Apr. 21, 2015

(54) METHOD AND SYSTEM FOR ENHANCED SECURITY USING LOCATION BASED WIRELESS AUTHENTICATION

(75) Inventor: Ian Clough, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 1921 days.

This patent is subject to a terminal disclaimer.

(21) Appl. No.: 11/735,054

(22) Filed: Apr. 13, 2007

(65) Prior Publication Data

US 2007/0184818 A1     Aug. 9, 2007

Related U.S. Application Data

(63) Continuation of application No. 11/066,466, filed on Feb. 28, 2005, now Pat. No. 7,221,949.

(51) Int. Cl.
| | |
|---|---|
| H04W 24/00 | (2009.01) |
| H04W 12/06 | (2009.01) |
| G06Q 30/06 | (2012.01) |
| H04L 29/06 | (2006.01) |
| H04W 4/02 | (2009.01) |
| H04W 4/12 | (2009.01) |
| H04W 8/10 | (2009.01) |

(52) U.S. Cl.
CPC .............. *H04W 12/06* (2013.01); *G06Q 30/06* (2013.01); *H04L 63/083* (2013.01); *H04W 4/02* (2013.01); *H04W 4/12* (2013.01); *H04W 8/10* (2013.01)

(58) Field of Classification Search
USPC ............. 455/456.1, 456.2, 456.3, 456.5, 410, 455/411
See application file for complete search history.

(56) References Cited

U.S. PATENT DOCUMENTS

| | | | |
|---|---|---|---|
| 6,650,902 B1 | 11/2003 | Richton | |
| 6,664,922 B1 | 12/2003 | Fan | |
| 7,139,820 B1 * | 11/2006 | O'Toole et al. | 709/223 |
| 7,496,527 B2 * | 2/2009 | Silverstein et al. | 705/26.8 |
| 7,707,413 B2 * | 4/2010 | Lunt et al. | 713/168 |
| 2002/0187772 A1 * | 12/2002 | Hyyppa et al. | 455/411 |
| 2003/0120940 A1 | 6/2003 | Vataja | |

(Continued)

FOREIGN PATENT DOCUMENTS

| | | |
|---|---|---|
| WO | 2004012424 | 2/2004 |
| WO | 2004079499 | 9/2004 |
| WO | 2004095857 | 11/2004 |

OTHER PUBLICATIONS

EP Application No. 05101518.8, Communication pursuant to Article 94(3) EPC, dated Nov. 30, 2009.

(Continued)

*Primary Examiner* — German J Viana Di Prisco
(74) *Attorney, Agent, or Firm* — Moffat & Co.

(57) ABSTRACT

A method and system for enhancing security using location-based wireless authentication for a mobile device, the method comprising the steps of: sending from the mobile device to a base station a message, the message having a unique identifier associated with the mobile device; appending, at the base station, a location identifier to said message; sending the message to a recipient; and authenticating the message at the recipient, said authenticating step confirming that the location identifier appended at the base station corresponds with an expected location for the message.

8 Claims, 3 Drawing Sheets

(56) References Cited

U.S. PATENT DOCUMENTS

| | | | |
|---|---|---|---|
| 2003/0135463 A1* | 7/2003 | Brown et al. | 705/44 |
| 2003/0159066 A1* | 8/2003 | Staw et al. | 713/201 |
| 2003/0169881 A1* | 9/2003 | Niedermeyer | 380/258 |
| 2003/0186710 A1* | 10/2003 | Muhonen et al. | 455/456.5 |
| 2003/0195002 A1 | 10/2003 | Singhal et al. | |
| 2003/0216996 A1 | 11/2003 | Cummings et al. | |
| 2004/0093281 A1* | 5/2004 | Silverstein et al. | 705/26 |
| 2004/0127231 A1* | 7/2004 | Dor et al. | 455/456.6 |
| 2004/0137915 A1 | 7/2004 | Diener et al. | |
| 2004/0185842 A1 | 9/2004 | Spaur et al. | |
| 2004/0198386 A1* | 10/2004 | Dupray | 455/456.1 |
| 2004/0203581 A1* | 10/2004 | Sharon et al. | 455/406 |
| 2004/0203862 A1 | 10/2004 | Wood et al. | |
| 2004/0203870 A1* | 10/2004 | Aljadeff et al. | 455/456.1 |
| 2004/0203900 A1 | 10/2004 | Cedervall et al. | |
| 2004/0203901 A1 | 10/2004 | Wilson et al. | |
| 2004/0203903 A1 | 10/2004 | Wilson et al. | |
| 2004/0224702 A1 | 11/2004 | Chaskar | |
| 2005/0032531 A1 | 2/2005 | Gong et al. | |
| 2005/0048946 A1* | 3/2005 | Holland et al. | 455/404.1 |
| 2005/0071671 A1 | 3/2005 | Karaoguz | |
| 2006/0064346 A1* | 3/2006 | Steenstra et al. | 705/14 |
| 2006/0074660 A1 | 4/2006 | Waters et al. | |
| 2007/0140214 A1* | 6/2007 | Zoltan | 370/352 |
| 2008/0160953 A1* | 7/2008 | Mia et al. | 455/404.2 |

OTHER PUBLICATIONS

Denning et al., Location-Based Authentication: Grounding Cyberspace for Better Security, Computer Fraud & Security, Feb. 1996.

Bluesoft Inc., Interlink Networks and Bluesoft partner to delivery Wi-Fi location-based security solutions, Press Release, Apr. 24, 2003.

CP 2,537,455, Canadian Intellectual Property Office Examiner's Requisition Letter dated Aug. 31, 2009.

EP05101518, European Search Report dated May 31, 2005.

* cited by examiner

METHOD AND SYSTEM FOR ENHANCED SECURITY USING LOCATION BASED WIRELESS AUTHENTICATION

RELATED APPLICATIONS

The present application is a continuation of U.S. patent application Ser. No. 11/066,466, entitled "Method And System For Enhanced Security Using Location-Based Wireless Authentication" filed Feb. 28, 2005. The full disclosure, including the drawings, of U.S. patent application Ser. No. 11/066,466 are incorporated herein by reference.

FIELD OF THE APPLICATION

The present application deals with enhanced security for transactions involving a wireless device, and in particular deals with the use of the location of the wireless device to provide an additional level of security for a wireless transaction.

BACKGROUND

It is often necessary to identify the user of a remote device to facilitate a transaction. However, spoofing often occurs to fake digital credentials or the identity of a user. Further, basic security means such as a numerical personal identification number may not provide the level of security required for a transaction.

No method of authentication is foolproof. Passwords and personal identification numbers can be cracked through guessing or brute force computation techniques. Devices can be stolen. Security information can be intercepted and replayed at a future time.

In many transactions, it would be helpful if the location of the device was verified to ensure that the transaction was occurring at a logical place. For example, if a user is using a mobile device to perform a transaction at a physical store, location metrics that indicate that the device is actually physically located in a different city, part of the country, or part of the world than the store would provide an indicator that the transaction should not proceed.

Various methods to providing geographic locations have been proposed. These include a paper entitled "*Location-based Authentication: Grounding Cyberspace for Better Security*", Dorothy E. Denning and Peter F. McDorran, Computer Fraud and Security, 1996, Elsevier Science Ltd., which proposes to use global positioning system signals from a network of satellites in order to provide the physical location of a mobile device. The problem with this and other similar solutions is that the location information is conveyed from the mobile device. This creates various issues. As described in the above-mentioned reference, the device is required to contain global positioning system receivers that are specially built in order to avoid spoofing. This is a costly technical solution that would require the modification of commercial mobile devices, such as cellular telephones, mobile data devices, or other current wireless devices. Without the use of special GPS-based receivers, the author admits that commercial GPS receivers are readily spoofed. Thus the above uses either expensive modifications or adds little security.

SUMMARY OF THE INVENTION

The present system and method provide enhanced security by adding geographic data to a transaction request. The system and method use a carrier rather than a mobile device to add geographic information to a transaction. The geographic information is available for wireless communications based on the enhanced 911 (E911) system for mobile devices that is now required by the U.S. Federal Communications Commission (US FCC). The same technology can be used to validate transactions.

The present system and method provide enhanced security since the geographic information is added by the carrier, and is therefore impossible to spoof from the mobile device. Further, since the technology is commercially available and is required in wireless devices, no additional hardware is required in the mobile devices.

The present application therefore provides a system for enhanced security using location-based wireless authentication comprising: a mobile device, the mobile device having a unique identifier associated therewith and capable of sending a message with the unique identifier appended thereto; a base station, the base station capable of receiving the message from the mobile device and having: a location detection system to locate the mobile device, the base station forwarding the message through a data network; and means to append a location identifier to said message; and a recipient, the recipient receiving the message through the data network and having means to authenticate the message, the means to authenticate the message including a checking means to check whether the location identifier corresponds with an expected location for the mobile device.

The present application further provides a method for enhancing security using location-based wireless authentication for a mobile device comprising the steps of: sending from the mobile device to a base station a message, the message having a unique identifier associated with the mobile device; appending, at the base station, a location identifier to said message; sending the message to a recipient; and authenticating the message at the recipient, said authenticating step confirming that the location identifier appended at the base station corresponds with an expected location for the message.

BRIEF DESCRIPTION OF THE DRAWINGS

The present system and method will be better understood with reference to the drawings in which.

DETAILED DESCRIPTION

Figure 1:
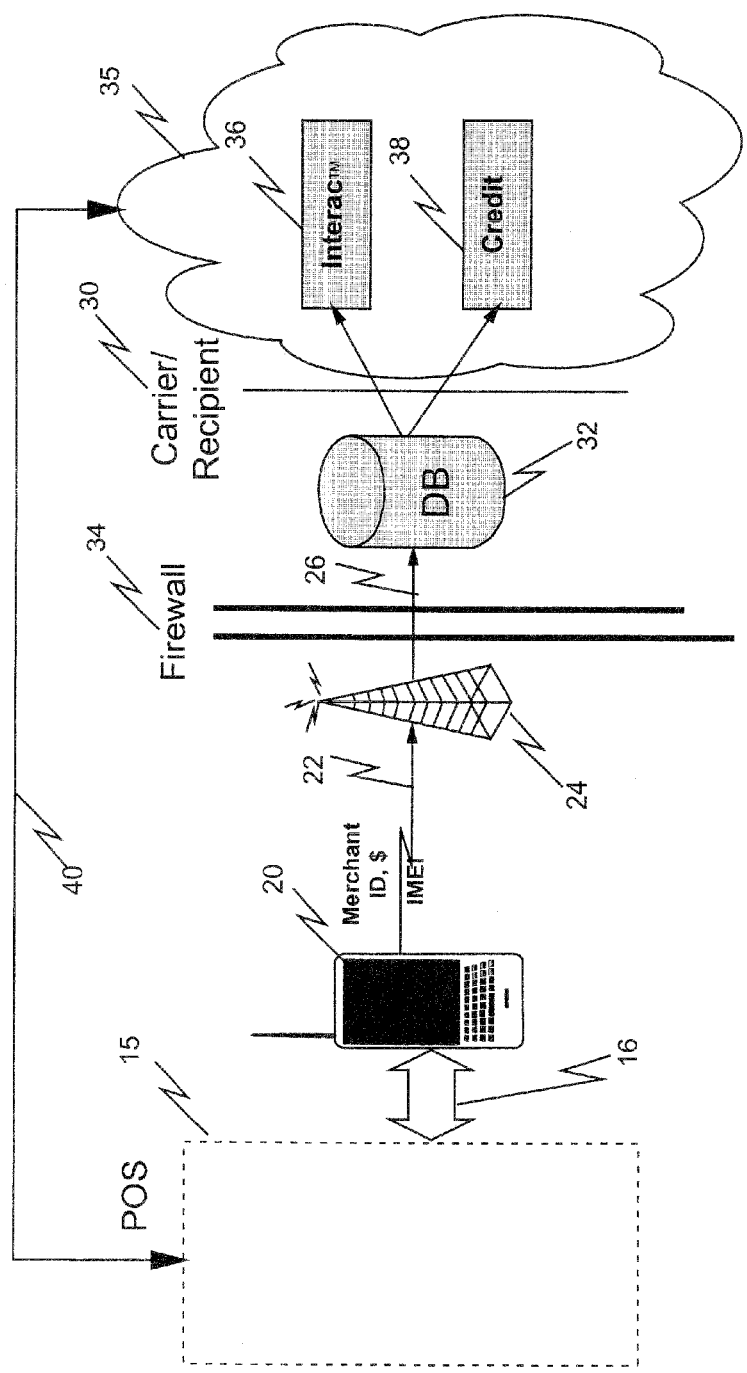
FIG. 1 is a diagram of a data path of an exemplary transaction according to the present system and method.

The present system and method may best be seen through an example, as is illustrated in FIG. 1 and described below. However, the present system and method is not meant to be limited to the system of FIG. 1, and is rather meant to encompass any transaction that has enhanced security through the addition of geographic information by a carrier.

Reference is now made to FIG. 1. In an example application, a user wishes to purchase a product at a local point of sale 15. The point of sale could be any physical store that is stationary and whose location is known in a system database. In alternative embodiments point of sale 15 could be a mobile store or vendor, but in this case the location of the vendor will also need to be determined.

In the system of FIG. 1, a user does not need to carry a credit or debit card or cash, but rather can perform a transaction using a mobile device. Such mobile devices are known in the art, and generally can include any data enabled device that is capable of wirelessly performing a transaction.

In the example of FIG. 1, each point of sale includes a merchant identification. On a wireless device 20, a user would add the merchant identifier and the amount that the user is going to pay the merchant. This information can be added to mobile device 20 either through input using a keyboard, keypad or other similar means, or through local communication means such as Bluetooth, IrDA, a USB cable, or other connection known to those skilled in the art. As will be appreciated, a password challenge could be added for authentication or the user could be required to enter a personal identification number or password in order to proceed with the transaction.

Wireless device 20 is associated with the point of sale 15 through a physical location matrix 16. Physical location metrics 16 can place wireless device 20 within, close to or removed from point of sale 15, Once the information is entered, it is transmitted wirelessly to base station 24 using a transmission 22. Transmission 22 includes the merchant ID number, the amount, and a unique identifier. The unique identifier preferably includes at least the international mobile equipment identifier (IMEI), and could include password information.

As will be realized by one skilled in the art, it is preferable that transmission 22 be encrypted, and such encryption is well known.

At base station 24, location information is further added to transmission 22. This location information is preferably based on the enhanced 911 system and based on FCC requirements can identify the location of a mobile device to at least within 150 m of its actual location. This is then sent as a message 26 to a carrier 30. Other location identifiers could however be used at the base station, including the physical location of the base station.

Carrier 30 preferably includes a database 32 which can be used for validating the merchant identifier. The merchant identifier is associated with a known geographic location X. The carrier 30 can then compare known geographic location X with the location added to transmission 26. The system is predicated on both the merchant and the user being in the same location, and if locations differ, the transaction will be found to be invalid and will not proceed. Transmission 26 may also have to pass through a firewall 34.

If the transaction is found to be in a valid location, the carrier can then pass the transaction to a debit system such as Interac™ system 36 or, if the carrier is large enough, the carrier can be used to provide credit to the user with credit system 38 in order to complete the transaction. These systems can be cumulatively or individually referred to as a point of sale processing location 35.

As will be appreciated, the merchant will likely require feedback from the carrier 30 or from an Interac™ system 36 to ensure that the transaction has been approved prior to giving the merchandise to the user. This could include, for example, a message along channel 40 between the point of sale processing location 35 and the point of sale 15.

The system can include, therefore, a user at a remote vendor or coin operated point of sale. The user can use the mobile station, which knows a transaction is occurring through a message from the vendor (by serial connection, or over the air) to display a dialog requesting a vendor ID and amount. The vendor ID could also be provided over the connection or message by the vendor.

The user can be prompted for a PIN or password. This information is encrypted and sent over the air to the financial institution. The financial institution further receives a coordinate for the device and this can be verified against the vendor ID provided. The results of the transaction can be sent to the user. Results can further be sent to the merchant over a normal channel, such as, for example an Interac™ channel.

The above therefore provides a system for a transaction with enhanced security by adding geographic information to the transaction. The geographic information is added at a carrier and can therefore not be spoofed by the mobile device. Further, since FCC requirements for mobile devices include the enhanced 911 system for locating the mobile device, no additional hardware is required on mobile devices that are compliant with FCC regulations. Similar regulations exist in other jurisdictions.

As will be appreciated by those skilled in the art, other examples and application could be used with the location identifier being added at base station 24. For example, if an application is only meant to run in a sports stadium, the application could be programmed to request a password or a start code from a carrier or verification company, and the start code would only be given if the physical location of the mobile device was verified.

In the sports stadium case, the message send to the base station could be a request for the start code. The message includes a unique identifier for the mobile device. In the sports stadium case no merchant ID, nor transaction amount is required to be in the message sent. The start code request is appended with the location at the base station, preferably using the Enhanced 911 system.

The message, with the unique identifier and the location code is then passed to a recipient. In this case the recipient could be the carrier, who has a deal with the stadium, or it could be to the company providing the enhanced service directly, or to some other verification company.

The recipient then verifies that the start code should be sent. This decision could be based on the unique identifier, for example to check whether the owner of the mobile device has prepaid for the service. The decision is also based on the location identifier. If the location is the sports stadium then the start code could be sent. Otherwise the start code will not be sent.

Yet further applications for the present system and method could include the verification of a geographic location before a transaction can proceed. For example, in a network communication, the network may require the verified location of the device prior to allowing access beyond a firewall. This could be used to help track the location of the mobile device if there is a security breach in the network.

Again, in this case the mobile device sends a message including a unique identifier for the mobile device, along with whatever information is needed by the network, to a base station. The base station appends the location information and the modified message is passed to the carrier or other recipient for verification.

The recipient verifies the information based on factors including the location and allows the mobile device access to the network.

In a further alternative embodiment, a normal commercial transaction between a point of sale 15 and a point of sale processing location 35 can occur. As an added level of security, a location metric can be used to verify the user is in the location of the vendor.

For example, a user wishing to purchase goods using a debit card could swipe his/her card at a standard terminal as normal and enter a pin number. The transaction occurs using channel 40 between point of sale processing location 35 and the terminal at the point of sale 15.

At point of sale processing location 35, the Interac™ system 36 or credit system 38 access the account and find that the account requires an added level of security. The location of the user needs to be verified.

The point of sale processing location 35 communicates with a database 32 to verify the location of a mobile device 20 associated with the user. Alternatively this information could be passed to point of sale processing location 35.

In order to obtain the location of mobile device 20, database 32 can either send a message to the mobile device 20 asking mobile device 20 for its current location, or a record can be stored regarding the last location of mobile device 20. For most mobile devices 20, a message is passed between base station 24 and the mobile device periodically to ensure the mobile device is still on the network. The location of the mobile device 20 can be stored based on this message. Further, if mobile device 20 moves to a different base station 24 a handshaking routine occurs and the location can be stored based on this routine.

If relying on stored location information, the system may not be able to match the last location of the mobile device 20 to the exact point of sale 15. However, the carrier or recipient could perform an assessment to determine whether the mobile device 20 could have moved to the location of the vendor since the location of the mobile device 20 was last stored.

Thus based on either the query or on the last location of the mobile device 20, a carrier/recipient can determine whether it is logical for the transaction to occur. If the mobile station could not possibly be at the point of sale 15 then the carrier/recipient can inform the point of sale processing location 35 and the transaction can be stopped.

As will be appreciated by those skilled in the art, the transaction can be stopped by indicating that there are insufficient funds to complete the transaction, by sending some form of error code back to point of sale 15, or through other means normally available for commercial transactions like this. In one alternative embodiment, a verification message could be sent to mobile device 15 asking the user to allow or prohibit the transaction if there appears to be a discrepancy.

The above alternative solution presents the advantage that nothing needs to be keyed into the mobile device but that an added layer of security is added to the transaction. Further, the added level of security will likely not be apparent to those witnessing the transaction. For example, if an attendant obtains a copy of the data when a card is swiped and observes the PIN, he or she will likely not be aware that the mobile device the user had in her purse was also a necessary part of the transaction, and an attempt to use the stolen information at a later time will fail.

Figure 2:
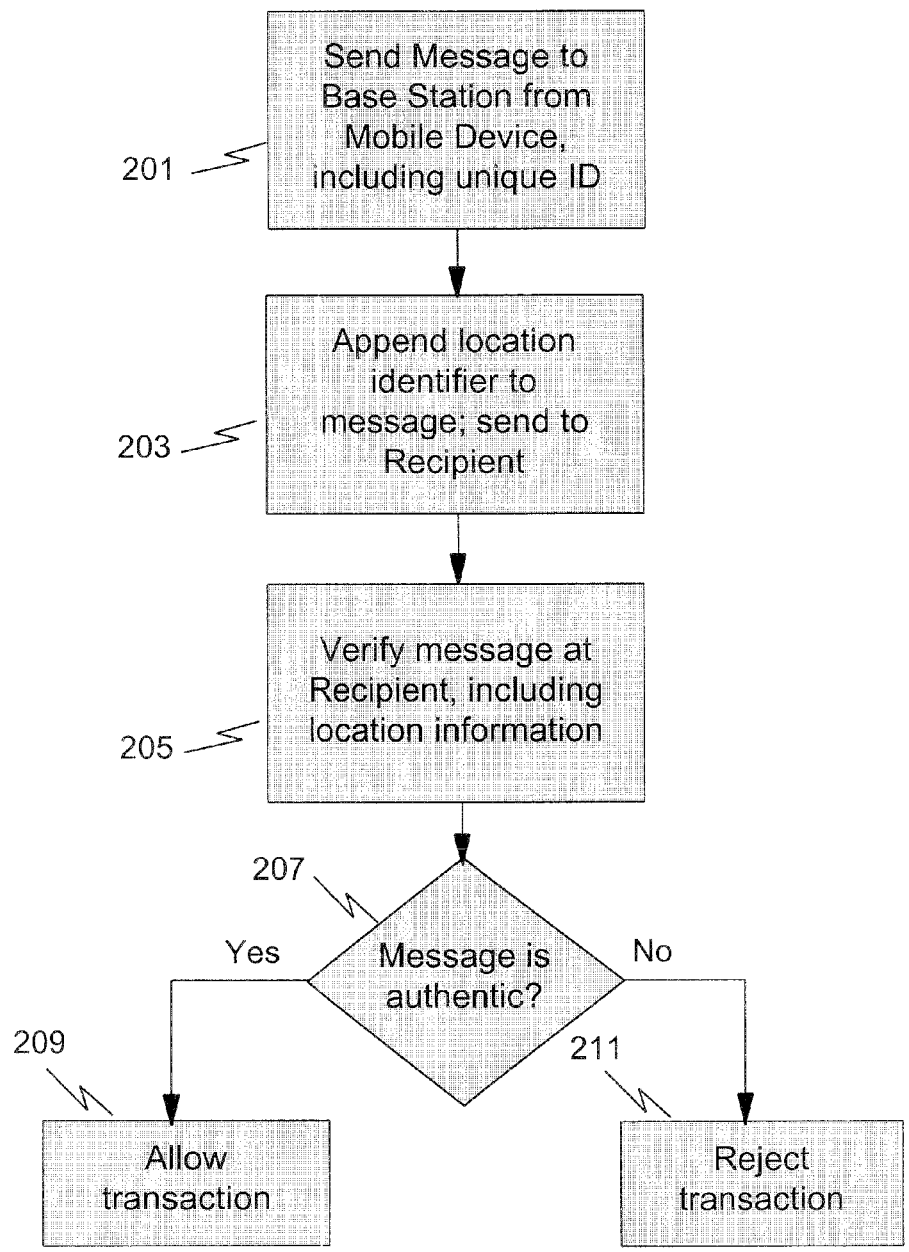
FIG. 2 is a simplified flow chart of a method according to the present application.

The above is shown in the simplified flowchart of FIG. 2. FIG. 2 shows that at step 201 a mobile device sends a message to a base station. The message can include any number of parameters, but will include at least a unique identifier identifying the mobile device. Other parameters could include a merchant ID and dollar amount for a transaction that the user is trying to pay for, or an identifier for the application that the user is trying to open, or a PIN or other password. In the case where the user is using a standard point of sale device to complete the transaction, the message could be verification that the device is still active. If the mobile device 20 is being used for the transaction other information such as the merchant ID may be required.

In step 203 the base station receives the message and appends a geographic indicator. This is preferably done through the enhanced 911 (E911) system. The message is then routed to the carrier and possibly though a data network to a different recipient.

The carrier or recipient receives the message at step 205 and authenticates the message. Authentication can be a check that the password and unique identifier match, or that an application is associated with the unique identifier, or other authentication that would be known to those skilled in the art. Alternatively, the carrier or recipient could simply store the location of the mobile device 20 based on the message.

If the message is part of an active transaction or a response to a location inquiry, the authentication also includes a check to ensure the location for the mobile device is the expected location. That is, if the user is in a financial transaction with a merchant, the authentication step confirms that the mobile device is at a location appropriate for such a transaction. If the mobile device is trying to access an application that can only run at a stadium, the authentication step can confirm the mobile device is at the stadium.

In step 207 a check is made to see if the authentication step showed the message was authentic. If so, the recipient proceeds to step 209 in which the transaction is allowed to proceed. This could include sending information back to the mobile device such as a start code for the application, sending the transaction on to a financial service to continue the transaction, or sending verification of the location of the mobile device to a financial service. Such a service could debit a user's account or credit card and send confirmation that the transaction has gone through to both the user and to the merchant, for example.

If in step 207 the message is found not to be authentic, for example if the user is located in a different city than the merchant or the user is in a different part of town from the stadium, then the recipient rejects the transaction and appropriate messages are preferably sent back to the user and possibly to the merchant.

FIG. 2 therefore illustrates a method for the location-based authentication of a message from a mobile device.

As will be appreciated by those skilled in the art, the addition of the unique identifier at the mobile device, along with a PIN if required, is accomplished as part of the transport layer in the mobile device, and not at the application layer. This further enhances the security since in most instances the user cannot change the IMEI number.

Figure 3:
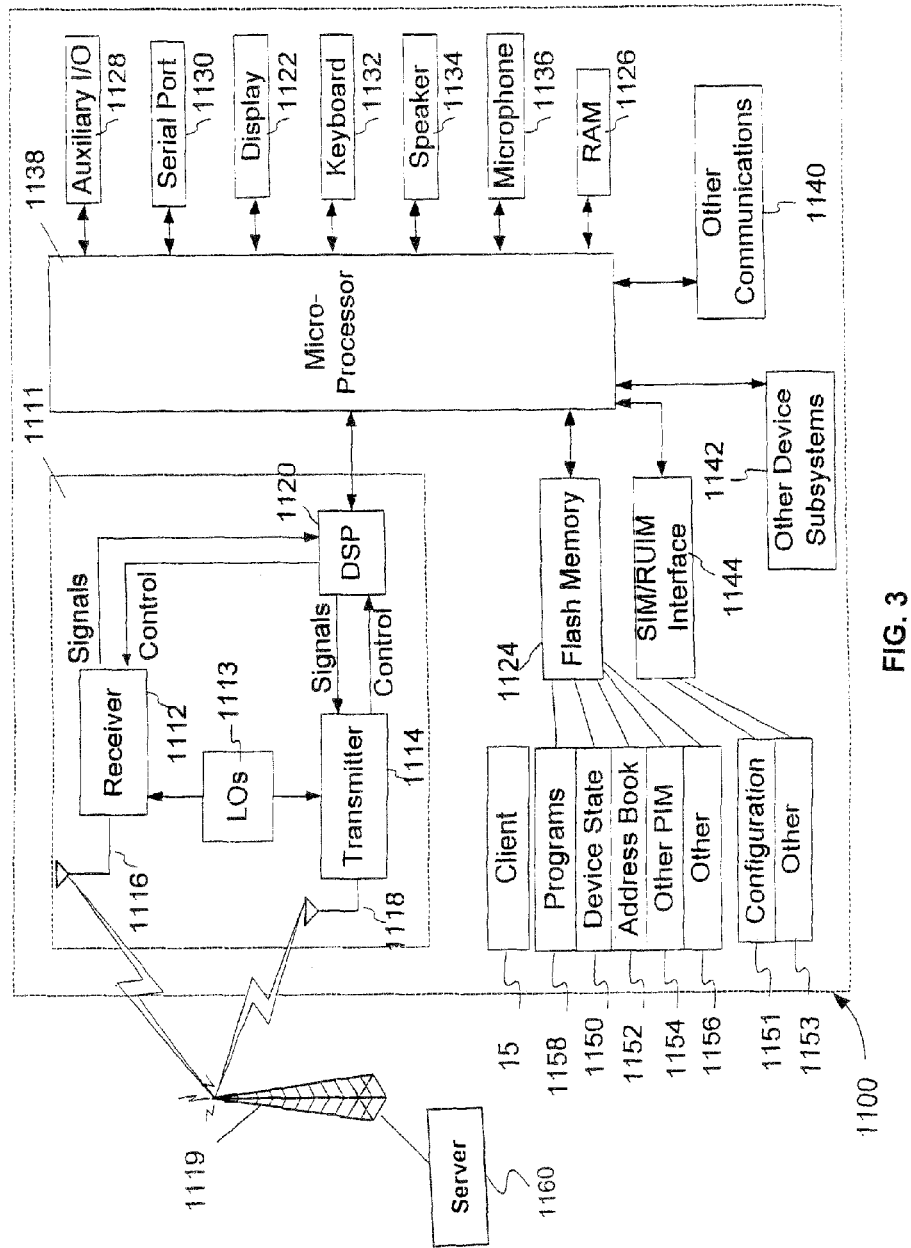
FIG. 3 is a block diagram of an exemplary mobile device that can be used in accordance with the present system and method.

Reference is now made to FIG. 3. FIG. 3 is a block diagram illustrating a host mobile device including preferred embodiments of the techniques of the present application. Mobile device 1100 is preferably a two-way wireless communication device having at least voice and data communication capabilities. Mobile device 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile device 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile device 1100 is registered on the network using a unique identification number associated with each mobile device. In UMTS and GPRS networks, and in some CDMA networks, however, network access is associated with a subscriber or user of mobile device 1100. A GPRS mobile device therefore requires a subscriber identity module (SIM) card in order to operate on a GPRS network, and a RUIM in order to operate on some CDMA networks. Without a valid SIM/RUIM card, a GPRS/UMTS/CDMA mobile device may not be fully functional. Local or non-network communication functions, as well as legally required functions (if any) such as emergency calling, may be available, but mobile device 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile device 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile device 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 3 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on mobile device 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile device 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile device 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would preferably be output to a speaker 1134 and signals for transmission would be generated by a microphone 1136. Alternative voice or audio I/O subsystems, such as a voice message recording subsystem, may also be implemented on mobile device 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 3 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile device 1100 and different systems or devices, which need not necessarily be similar devices. For example, the subsystem 1140 may include an infrared device and associated circuits and components or a Bluetooth™ communication module to provide for communication with similarly enabled systems and devices.

In one embodiment, mobile device 1100 could include a Global Positioning System (GPS) or Advanced Global Positioning System (AGPS) module to enable mobile station 1100 to determine its location.

The exemplary mobile device of FIG. 3 is meant to be illustrative and other devices with more or fewer features than the above could equally be used for the present method and apparatus.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. An improved base station for use in authentication of a transaction, the base station forming part of a wireless network and communicating with a mobile device and with a network, the base station comprising:
   a processor;
   a communications subsystem;
   wherein the processor and communications subsystem cooperate to:
      receive a transaction message from the mobile device, the transaction message being a request to complete a financial transaction between a user of the mobile device and a merchant, the transaction message including:
         a merchant identifier identifying the merchant; and
         an International Mobile Equipment Identifier (IMEI) number, the IMEI number being inserted by a transport layer at the mobile device;
      append to the transaction message a location identifier, the location identifier indicating a location of the mobile device;
      forward the transaction message with the location identifier to a recipient device, system or apparatus,
   wherein the authentication uses the location identifier to ensure the transaction is valid.

2. The base station of claim 1, wherein the location identifier identifies a location of the base station.

3. The base station of claim 1, wherein the location identifier is determined based on enhanced 911.

4. A method of transaction authentication comprising the steps of:
   sending, from a mobile device, a transaction message to a recipient, the transaction message being a request to complete a financial transaction between a user of the mobile device and a merchant, the transaction message including:
      a merchant identifier identifying the merchant, and
      an International Mobile Equipment Identifier (IMEI) number, the IMEI number being inserted by a transport layer at the mobile device;
   appending, at a base station, a location identifier to the transaction message, the location identifier indicating a location of the mobile device;
wherein said location identifier can be used by said recipient to authenticate that the transaction is occurring in an expected location.

5. The method of claim 4, wherein said transaction is a commercial purchase.

6. The method of claim 4 wherein the location identifier identifies the location of a mobile device.

7. The method of claim 4 wherein the location identifier identifies the location of a base station.

8. The method of claim 4, wherein the transaction message includes a personal identification number.

\* \* \* \* \*